Oct. 6, 1953  S. HORELICK  2,654,142
METHOD OF MAKING AND STAYING ELECTRICAL
TRANSFORMER WINDINGS
Filed July 23, 1947 2 Sheets-Sheet 2
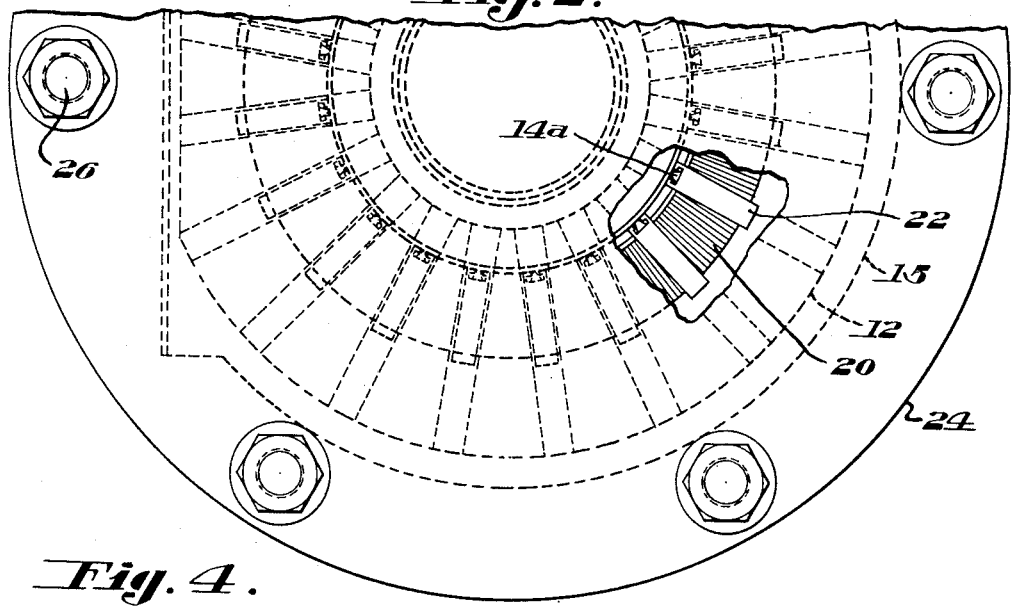
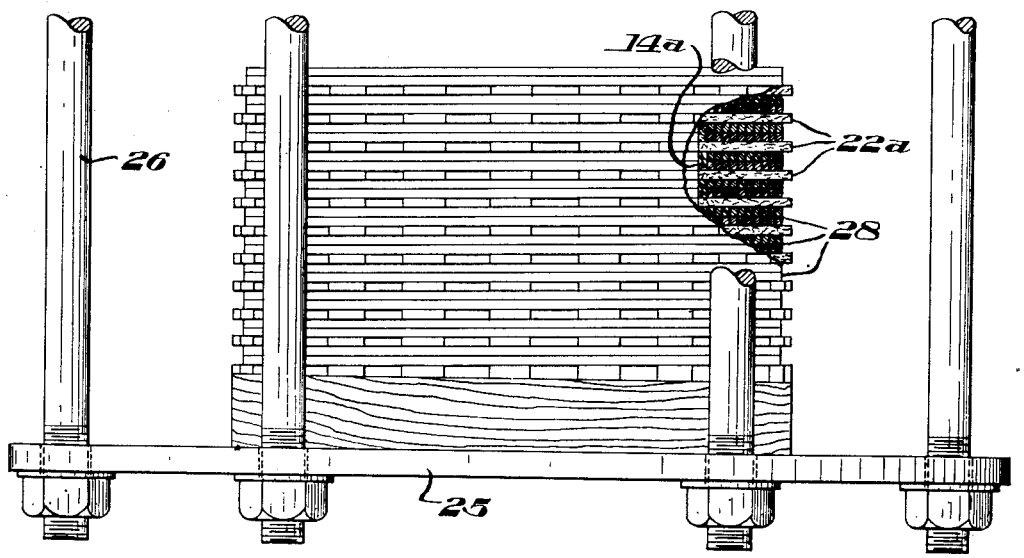
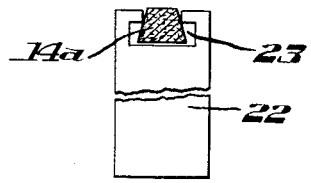
INVENTOR
SAMUEL HORELICK
by his attorneys
Stebbins, Blenko & Webb Patented Oct. 6, 1953

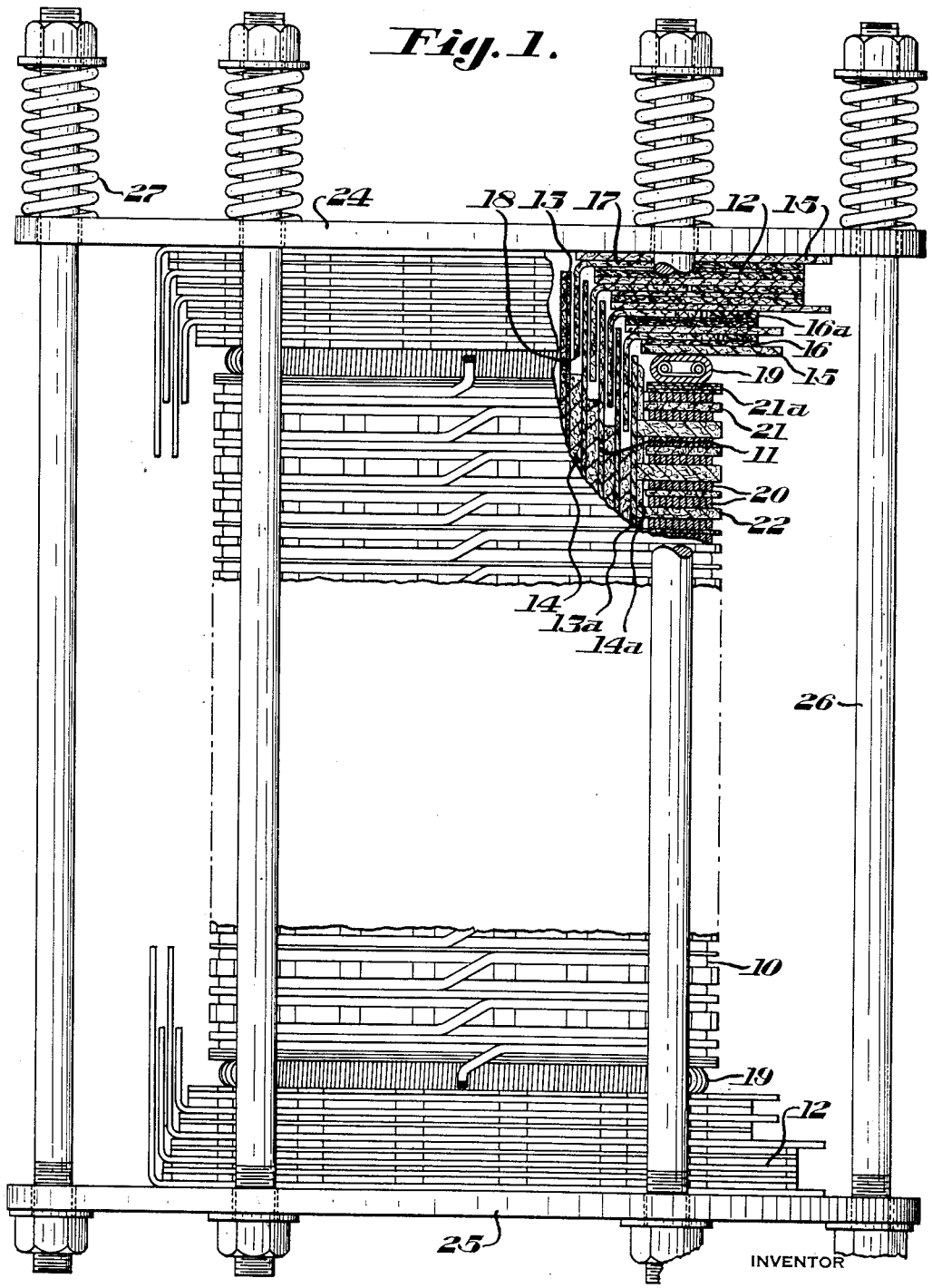

2,654,142

UNITED STATES PATENT OFFICE 2,654,142

METHOD OF MAKING AND STAYING ELECTRICAL TRANSFORMER WINDINGS

Samuel Horelick, Pittsburgh, Pa., assignor, by mesne assignments, to McGraw Electric Company, a corporation of Delaware Application July 23, 1947, Serial No. 763,082

3 Claims. (Cl. 29—155.56)

This invention relates to electrical transformer windings and, in particular, to high-voltage windings for power transformers and the manufacture thereof.

The high-voltage windings of power transformers are usually of either the pancake or helical type. Immersion of such windings in oil or other insulating liquid is usually the best method of insulating against the high voltages for which power transformers are designed. High-voltage windings of the type mentioned, however, as constructed heretofore, have lacked the mechanical strength to resist distortion caused by electromagnetic forces resulting from short-circuit, despite the fact that they are usually clamped under pressure between end plates. To impart the necessary strength and rigidity to the windings, it has been customary to dip them in varnish. This treatment, however, is not free from objections. The varnish being oil-proof prevents the insulating oil from penetrating through the insulation surrounding each turn of wire. There is also the danger of trapping air in the turn insulation so that it cannot be removed but remains as a weak point in the insulation and a possible cause of breakdown of the insulation.

I have invented a novel method of making a transformer winding which overcomes the aforementioned objections. My improved winding has the turns of each coil bonded together and adjacent coils bonded to each other by radial spacers coated with a heat-reactive compound such as shellac, to form an integral mass strong enough to resist short-circuit stresses without the necessity of dipping in varnish. In making the improved winding, if it is of the pancake type, I assemble the coils with shellac-coated spacers therebetween. In the case of a helical winding, I insert the spacers between turns. I then apply pressure axially of the completed winding and subject it to heat while maintaining pressure thereon, thus curing or polymerizing the shellac after an initial softening thereof, and permanently staying the several coils of a pancake winding or the coil turns of a helical winding by bonding them firmly to the spacers. The resulting adhesion gives the winding the mechanical strength necessary to withstand short circuits safely and, at the same time, leaves the turns largely exposed to the oil for easy penetration thereby of the turn insulation, free of the oil-proofing effect of the varnish coating which has been applied previously.

A complete understanding of the invention may be obtained from the following detailed description and explanation which refer to the accompanying drawings illustrating the present preferred embodiment and practice. In the drawings, Figure 1 is an elevation partly in section showing a winding assembled from a plurality of pancake coils and spacers, compressed between end plates;

Figure 2 is a partial plan view thereof partly broken away;

Figure 3 is a partial horizontal section to enlarged scale showing the connection between the radial spacers and vertical spacers; and Figure 4 is a partial elevation similar to Figure 1 showing the invention applied to a helical winding.

Referring in detail to the drawings and, for the present, to Figures 1 through 3, a high-voltage transformer winding of the pancake type indicated generally at 10 is built up on a composite cylindrical insulation barrier 11 having flanges and end rings 12. In the completed transformer the low-voltage windings (not shown) are disposed within the barrier 11 and one leg of the laminated core extends through them. The barrier 11 is composed of alternating, laminated tubes 13 and spacer strips 14 spaced circumferentially thereof. The tubes are preferably of laminated paper and the spacer strips of pressboard. The flanges or end rings 12 are composed of washers 15 and radial spacers 16 and 16a spaced circumferentially thereof. Angle collars 17 have horizontal flanges disposed between the washers and cylindrical necks 18 fitting down into the tubes 13. The washers 15, spacers 16 and 16a and angle collars 17 are of pressboard. Static shield rings 19 are disposed between the flanges 12 and the winding 10.

The complete high-voltage winding 10 is assembled in the known manner from pancake coils 20, washers 15 and collars 17, spacers 16 and 16a, tubes 13 and spacer strips 14. Vertical spacer strips 14a are placed in circumferentially spaced relation about the outermost tube 13a. These spacer strips are of dovetail shape as shown in Figure 3 and are applied to the tube 13a with their narrower side innermost. They may conveniently be secured to the tube temporarily by any convenient means.

Pressboard washers 21 are disposed between the pancake coils 20 of each pair. Similar washers 21a are disposed between the top and bottom coils and the static shield rings. Between each successive pair of coils 20 I insert radial spacers 22 of pressboard, in circumferentially spaced relation as shown in Figure 2. The spacers 22 are notched at their inner end as indicated at 23 for anchorage to the vertical spacer strips 14a.

The washers 21 and the spacers 22 have their top and bottom surfaces coated with a layer of heat-reactive material such as shellac or other material which softens and becomes tacky when first heated and is then polymerized or cured and converted permanently so that it retains the solid state even on subsequent heating. Numerous synthetic resins have this property as well as natural shellac. These compounds are preferably applied to the washers and spacers by dissolving them in a volatile solvent and brushing or spraying the solution on the surfaces of these parts. After drying, the parts have a thin film of solid shellac or other compound on the surfaces thereof which are engaged by the turns of the coils 20 when the winding 10 is assembled.

When the winding 10 has been completely assembled on the barrier 11 with the flanges 12, I clamp the entire assembly between end plates 24 and 25. The end plates may be drawn together by through bolts 26. Compression springs 27 are disposed under the nuts at one end of the bolts and the nuts are turned down sufficiently to compress the springs so that if the winding shrinks during subsequent processing to be described shortly, the springs will expand and continuously maintain a certain degree of pressure on the winding.

When the winding has been clamped between the end plates, I subject it to heating for several hours at a moderate temperature sufficient to drive off any moisture and to polymerize or cure the film or layer of shellac or other similar material on the surfaces of the washers 21 and spacers 22 in contact with the top and bottom faces of the coils 20. As the winding is heated to the curing temperature of the shellac coating on the washers and spacers, the shellac first softens and becomes tacky. As polymerization proceeds, the material cures or sets permanently in the form of a solid which thereafter remains substantially rigid. By maintaining the coils in contact with the washers and spacers under pressure throughout the heating period, I thus obtain a firm bond between them as the shellac is cured after which the washers and spacers serve to stay the turns of the coils. In fact, the entire winding 10 becomes a more or less integral mass after being heated. The radial spaces between the spacers 22 provide passages for insulating oil to flow radially through the winding and afford free access thereof to substantially all portions of the coils 20 when the completed winding is assembled with the low-voltage windings and core and immersed in the usual tank filled with oil. The oil thus readily penetrates the paper wrapping on the turns of the coils 20 and fills all the spaces between turns and between adjacent coils, eliminating any air pockets which would constitute a weak point in the transformer insulation.

As previously pointed out, the springs 27 cause the end plates 24 and 25 to continue to apply pressure to the winding even after the shrinkage thereof incident to drying. After the winding has been heated for a period sufficient to dry it thoroughly and cure the shellac coating on the washers and spacers, the end plates are removed and the high-voltage winding is then ready for assembly with the low-voltage windings and core.

The windings are secured to the core in the usual manner and the usual clamping bars applied across the ends of the windings and connected together by tie rods in the customary way.

Figure 4 shows a winding 28 similar to that shown at 10 except that, instead of being composed of stacked pancake coils 20, it is formed by winding a plurality of conductors disposed side-by-side in a continuous helix. The turns of the helix are maintained in spaced relation by spacers 22a similar to the spacers 22 and strung on spacer strips 14a in the same manner as the latter. The winding 28 does not include any washers 21 since the turns are helical instead of being of flat, pancake shape. The spacers 22a are coated with shellac or similar compound in a manner already explained and the winding 28 is processed in the same way as the winding 10.

It will be apparent from the foregoing that the invention provides a transformer winding having important advantages over the high-voltage transformer windings made by the method known previously. In the first place, a winding according to my invention is insulated by the maximum dielectric value of the medium employed, i. e., oil, since air pockets are avoided and free access for the oil is afforded to all portions of the winding. Secondly, the bonding of the winding turns to the radial spacers and washers, if used, serves to stay the turns and maintain them rigidly in proper relative position under the stress resulting from short-circuit, thus avoiding distortion and possible breakdown. In addition, the cost of the varnish treatment used heretofore, which is substantial, is avoided. The cost of coating the washers and spacers with shellac or similar compound is materially less than the cost of the varnish treatment.

Although I have illustrated and described but a preferred embodiment and practice with a modification, it will be recognized that changes in the details of the procedure and construction disclosed may be made without departing from the spirit of the invention or the scope of the appended claims.

I claim:

1. In combination, in a method of making and staying an electrical winding, the steps comprising, assembling a plurality of coil turns in side-by-side relation to form a plurality of axially disposed layers of such turns, coating a plurality of relatively rigid insulating spacers on opposite surfaces thereof with a heat-reactive bonding compound, fastening said spacers in radially and circumferentially spaced relation to said coil turns and between adjacent layers thereof as successive layers are assembled with said opposite surfaces against said coil turns, pressing said coil turns and spacers together in an axial direction, heating said compound to bond said spacers to said coil turns, and maintaining said pressure during said heating, whereby said layers may be left unbonded in at least the circumferential lengths thereof between spacers.

2. In combination, in a method of making and staying an electrical winding, the steps comprising, assembling a plurality of coil turns, untreated with a heat-reactive bonding compound, in side-by-side relation to form a plurality of axially disposed generally coaxial layers of such turns, assembling a plurality of relatively rigid insulating spacers coated on opposite surfaces thereof with a heat-reactive bonding compound by anchoring said spacers in circumferential spaced arrangement and extending radially between adjacent ones of said layers with said opposite surfaces against the coil turns in said layers as successive layers are assembled, pressing said coil turns and spacers together in an axial direction, heating at least said compound to bond said spacers to said coil turns, and maintaining said pressure during said heating, whereby said layers may be left unbonded in at least the circumferential lengths thereof between spacers.

3. In combination, in a method of making and staying an electrical winding, the steps comprising, assembling a stack of pancake windings having coil turns, untreated with a heat-reactive bonding compound, in side-by-side relation about an insulation barrier extending axially inside of said coils, fastening a plurality of generally rectilinear elongated relatively rigid insulating spacers coated on opposite surfaces thereof with a heat-reactive bonding compound to said barrier in circumferential spaced arrangement and extending radially outwardly relative to said coils as successive coils are assembled, assembling a plurality of generally circular relatively rigid insulating washers coated on opposite surfaces thereof with a heat-reactive bonding compound, alternating said spacers and said washers between adjacent coils and pairs of coils of said pancake windings with said opposite surfaces against the respective coil turns, at least heating said compound to bond said spacers and said washers respectively to said coil turns engaged by them, and continuously pressing said coils, spacers and washers together in an axial direction during said heating.

SAMUEL HORELICK.

References Cited in the file of this patent

UNITED STATES PATENTS

| Number | Name | Date |
| --- | --- | --- |
| 567,250 | Moody | Sept. 8, 1896 |
| 974,167 | Mayer | Nov. 1, 1910 |
| 1,159,770 | Hyde | Nov. 9, 1915 |
| 1,351,061 | Peters | Aug. 31, 1920 |
| 1,751,971 | Barnum | Mar. 25, 1930 |
| 1,826,297 | Apple | Oct. 6, 1931 |
| 1,877,254 | Ritter | Sept. 13, 1932 |
| 1,912,389 | Smith | June 6, 1933 |
| 1,998,827 | Worrell | Apr. 23, 1935 |
| 2,246,159 | Work | June 17, 1941 |
| 2,288,201 | Meyerhans | June 30, 1942 |
| 2,368,506 | Paluev | Jan. 30, 1945 |

FOREIGN PATENTS

| Number | Country | Date |
| --- | --- | --- |
| 335,557 | Great Britain | Sept. 24, 1930 |